Patented July 28, 1953

2,647,130

UNITED STATES PATENT OFFICE 2,647,130

N-(n-TETRADECYL)-N-(3,4-METHYLENEDI-OXYBENZYL)-N,N-DIMETHYLAMMONIUM CHLORIDE AND PREPARATION THEREOF

Charles Edward Kwartler, Albany, N. Y., assignor to Winthrop-Stearns Inc., New York, N. Y., a corporation of Delaware No Drawing. Application November 20, 1951, Serial No. 257,424

2 Claims. (Cl. 260—340.5)

This invention relates to N-(n-tetradecyl)-N-(3,4-methylenedioxybenzyl)-N,N-dimethylammonium chloride and to the preparation of the same.

I have discovered that N-(n-tetradecyl)-N-(3,4-methylenedioxybenzyl)-N,N-dimethylammonium chloride is highly useful as an antifungal agent and also exhibits useful antibacterial properties.

My new compound can be conveniently obtained by treating n-tetradecyldimethylamine with 3,4-methylenedioxybenzyl chloride. This reaction is represented by the following equation:

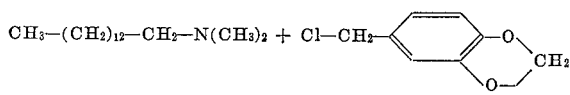 + 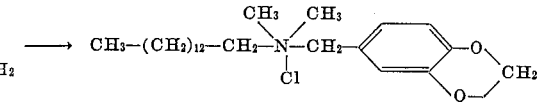

This reaction is advantageously carried out by heating approximately equimolecular proportions of the two reactants together at 40–100° C. in an organic solvent. The isolation of the desired product from the reaction mixture can be carried out by cooling the mixture directly or after partial removal of the organic solvent by evaporation, collecting the solid which separates from solution, and, if desired, submitting the product to purification procedures.

My invention is illustrated by the following example without, however, being limited thereto.

Example 12.05 g. of n-tetradecyldimethylamine and 8.57 g. of 3,4-methylenedioxybenzyl chloride were dissolved in 20 ml. of acetone, and the solution thus obtained was boiled under reflux for three hours. The reaction mixture was then cooled to 20° C. and 50 ml. of anhydrous ether was added. The solution was then cooled to 0° C. for thirty-six hours. The solid which separated from solution was collected on a filter, washed with about 50 ml. of anhydrous ether and dried in a vacuum desiccator over phosphorus pentoxide. There was thus obtained 19 g. of N-(n-tetradecyl)-N-(3,4-methylenedioxybenzyl)-N,N-dimethylammonium chloride which melted at 95–96° C.

I claim:

1. N-(n-tetradecyl)-N-(3,4-methylenedioxybenzyl)-N,N-dimethylammonium chloride.

2. The process for obtaining N-(n-tetradecyl)-N-(3,4-methylenedioxybenzyl)-N,N-dimethylammonium chloride which comprises treating n-tetradecyldimethylamine with 3,4-methylenedioxybenzyl chloride.

CHARLES EDWARD KWARTLER.

References Cited in the file of this patent

UNITED STATES PATENTS

| Number | Name | Date |
|---|---|---|
| 2,108,765 | Domagk | Feb. 15, 1938 |
| 2,511,879 | Rawlins | June 20, 1950 |

FOREIGN PATENTS

| Number | Country | Date |
|---|---|---|
| 685,321 | Germany | Dec. 15, 1939 |